_United States Patent Office_

3,838,149
Patented Sept. 24, 1974

3,838,149
STARCH PHOSPHATE ESTERS
Martin M. Tessler, Edison, N.J., assignor to National Starch and Chemical Corporation, New York, N.Y.
No Drawing. Filed Mar. 28, 1973, Ser. No. 345,661
Int. Cl. C08b 19/04
U.S. Cl. 260—233.5                                   10 Claims

ABSTRACT OF THE DISCLOSURE

A method for the preparation of starch phosphate esters is described wherein aqueous slurries or dispersions of a starch base are reacted with an N-phosphoryl-N'-alkyl or N-phosphoryl-N'-alkenyl or N-phosphoryl-N'-aralkyl substituted imidazole salt. The starch products may also be prepared by means of a dry procedure.

---

This invention relates to a method for the preparation of starch phosphate esters. More particularly, the invention relates to a method for the preparation of starch phosphate esters by the reaction of N-phosphoryl-N'-alkyl or N-phosphoryl-N'-alkenyl or N-phosphoryl-N'-aralkyl substituted imidazole salts with a starch base under specified reaction conditions. As herein used, the term "starch phosphate ester" means the monoester of starch and orthophosphoric acid, or any salt or acid salt thereof.

While many methods of starch esterification to produce starch phosphate esters have been proposed and are described in the literature, all of these methods involve dry reaction procedures and consist, essentially, in heat reacting starch which has been impregnated with a phosphate salt of an alkali metal, within a prescribed pH range. Thus, a representative method of the prior art for phosphorylating starch would involve impregnating starch with sodium dihydrogen phosphate (in an amount of from 2% to 4% by weight of the dry starch), at pH 4–8, drying the starch and heating at 248–266° F. (120–130° C.) for one to three hours. Starch reactions which are carried out in aqueous mediums are, from a large-scale production viewpoint, more efficient and economical.

It is the prime object of this invention to provide a new method for the preparation of starch phosphate esters in aqueous systems. Another object of this invention is to provide an efficient and economical reaction procedure for chemically altering the paste properties of starch. Various other objects and advantages of this invention will be apparent from the following description.

Thus, I have found that the objects of my invention may be accomplished by reacting a desired starch base, which is ordinarily suspended in water, with an N'-alkyl- or N'-alkenyl- or N'-aralkyl substituted N-phosphoryl imidazole salt wherein said N'-substituent has from 1–8 carbon atoms and one of the carbon atoms in the imidazole ring may be substituted with an alkyl group having from 1–3 carbon atoms. The reaction is usually carried out at temperatures ranging from about 65–205° F. (18.3–96.1° C.) at a pH level between 9.5 and 13 over periods ranging from 1 to 24 hours.

The N'-substituted N-phosphoryl imidazole salts useful in preparing the starch phosphate esters of this invention correspond to the following general formula:

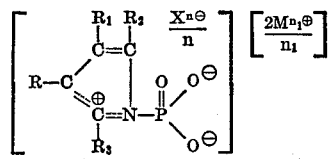

wherein R may be one of the following: an alkyl group, an alkenyl group, an aralkyl group; said groups having from 1–8 carbon atoms; $R_1$, $R_2$, and $R_3$ may be hydrogens or, at times, one of these designations may be an alkyl group having from 1–3 carbon atoms, and the remaining two are hydrogens; X is an anion, e.g., chloride, bromide, sulfate, etc.; M is a cation, e.g., sodium, calcium, potassium, ammonium, etc. or hydrogens at relatively low pH levels; and $n$ and $n_1$ represent the valence numbers of X and M, respectively.

The applicable starch base materials which may be used in preparing the starch phosphate ester products may be derived from any plant source including corn, potato, sweet potato, wheat, rice, sago, tapioca, waxy maize, sorghum, high amylose corn, or the like. Also included are the conversion products derived from any of the latter bases including for example, dextrines prepared by the hydrolytic action of acid and/or heat; oxidized starches prepared by treatment with oxidants such as sodium hypochlorite; derivatized starches such as starch ethers and esters; and, fluidity or thin boiling starches prepared by enzyme conversion or by mild acid hydrolysis. The use of the term "starch base" is thus seen to include any amylaceous substance, whether untreated or chemically modified which, however, still retain free hydroxyl groups capable of entering into the phosphorylation reaction of this invention. If the desired product is to be a granular starch then obviously the initial starting material must be in granular form. It is to be noted that the method of the invention may also be carried out employing gelatinized starches which will result in the production of non-granular, starch phosphate esters.

The preparation of the various N'-alkyl or N'-alkenyl or N'-aralkyl substituted N-phosphoryl imidazole salts useful in the practice of this invention is well described in the literature. For example, the preparation of the barium salt of N-phosphoryl-N'methylimidazole by the reaction of N-methylimidazole with phosphorous oxychloride in an aqueous, alkaline medium at a low temperature followed by the addition of a barium chloride solution is described by E. Jampel et al. in Tetrahedron Letters, No. 31, pp. 3535–6 (1968). This reaction which involves N-methylimidazole and phosphorus oxychloride is typical of those occurring in the preparation of any of the useful N-substituted imidazole phosphates described hereinabove. Set forth below is a chemical equation illustrating the preparation of this salt as disclosed in the Jampel et al. reference. As indicated, ethanol is added to precipitate the salt which is subsequently isolated:

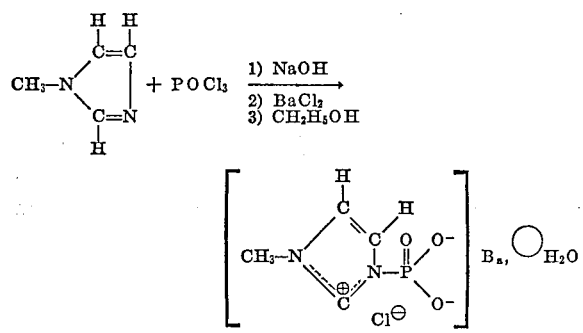

The product can be written with several different resonance structures, as follows:

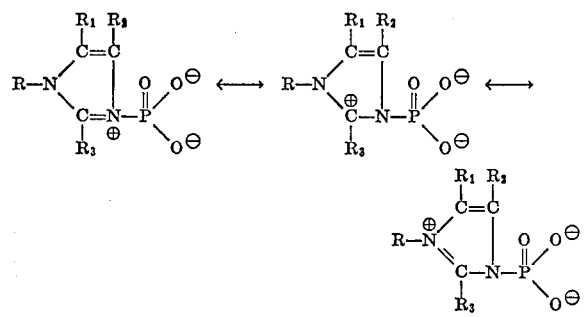

The structure

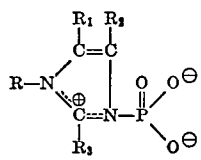

indicates that the positive charge is distributed over the two nitrogen and one carbon atoms in the ring, but the relative contribution of each of the three resonance structures to the product is not known.

The presence of the phosphoryl group bonded to the imidazole ring may be determined by any suitable, qualitative and quantitative method of analysis, e.g., infrared spectroscopy or nuclear magnetic resonance.

It is to be noted that in the preparation of the starch phosphate esters according to this invention, it is not required that the N'-substituted N-phosphoryl imidazole salt actually be isolated and purified prior to reacting with the starch base. In other words, the barium chloride and ethanol addition may be omitted, and the aqueous solution of the reaction product of N-substituted imidazole and phosphorus oxychloride may be used to phosphorylate the starch base.

Additional information concerning the preparation of the various N-phosphoryl, N'-substituted imidazoles useful in the practice of this invention may be obtained from inter alia, articles by W. Jenkes and M. Gilchrist in the J. Amer. Chem. Soc., 87, 3199 (1965) and by E. Guibe-Jampel et al. in the Bull. Soc. Chem. Fr., No. 4, 1308 (1971).

In more detail, a typical preparation of a starch phosphate ester in accordance with the method of this invention is carried out by admixing a selected N'-alkyl or alkenyl or aralkyl substituted N-phosphoryl imidazole salt and water. The selected starch base is then added to the resultant mixture. If preferred, sodium sulfate may be added to increase reaction efficiency. The practitioner will recognize that the order in which the reagents are added to form the reaction mixture is not of particular significance and variations may be employed herein.

The amount of phosphorylating reagent used to react with the starch base may vary from about 0.5 to 100%, based on the weight of starch depending on such factors as the selected starch base employed, the degree of modification which is desired in the end product, the particular phosphorylating reagent employed, the reaction temperature, and the pH.

The reaction temperature may vary from 65–205° F. (18.3–96.1° C.), depending on the ingredients used, particularly the starch base. For example, the preferred temperature at which a granular starch phosphorylation is carried out is from 95–125° F. (35–51.7° C.), and that for a non-granular starch phosphorylation is from 95–155° F. (35–68.3° C.).

The pH level at which the reaction is normally carried out may be from about 9.5–13 and preferably from 11–12.5. If it is desired to maintain a specific pH level, the pH may be controlled by the periodic addition of a base solution such as sodium hydroxide or any other suitable base, e.g., calcium hydroxide, potassium hydroxide, tetramethylammonium hydroxide, sodium carbonate, etc.

Reaction time will vary from about 1 hour to 24 hours depending on such factors as the reactivity of the reagent used, the amount of reagent used, the temperature employed, etc. After completion of the reaction, the pH of the reaction mixture is preferably adjusted to a pH of from about 5.0 to 7.0 using any common acid such as hydrochloric acid, sulfuric acid, acetic acid, etc. The resultant granular starch product is recovered by filtration and washed free of residual salts with water, and is thereafter dried. Alternatively, the washed product may be drum dried, or spray dried, or gelatinized and isolated by alcohol precipitation of freeze drying.

If the starch product is non-granular, it can be purified by dialysis to remove residual salts and isolated by alcohol precipitation or freeze drying.

In essence, the reaction by which the starch phosphate esters of this invention are produced may be typically illustrated as follows:

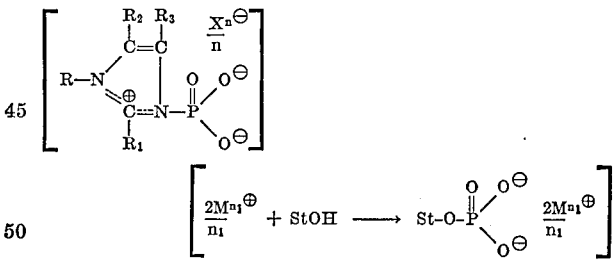

wherein StOH represents the starch molecule and R, $R_{1-3}$, X, M, $n$, and $n_1$ are as described hereinabove. This is a schematic equation which describes the chemical changes occurring during the reaction. The practitioner will recognize that the starch molecule is a polymer of glycose which contains three free hydroxyl groups per anhydroglucose unit in the polymer. (The non-reducing end glucose units contain four free hydroxyl groups.) Each of these hydroxyl groups can react as indicated in this equation. It is also known that the relative reactivity of each of the hydroxyl groups is not equivalent, some being more reactive than others, and that many of the hydroxyl groups from the same starch molecule will react to give the products of this invention.

If desired, the starch esters of this invention may also be prepared by a dry process. In carrying out a typical dry procedure, the N-phosphoryl-N'-substituted imidazole salt is added to an aqueous slurry of starch, and the pH of the resulting solution adjusted to 8.0–12.5. The starch is thereafter dried to about a 10% moisture content. The drying of the starch may be carried out by any suitable conventional method. The resulting dried mixture is heated (as by placing in an oven) at temperatures ranging from about 95 to 311° F. (35–155° C.). The reaction period (i.e. heating time) will vary with respect to the N-phosphoryl-N'-substituted imidazole salt employed, the selected starch base, etc. Reaction periods ranging from about 30 minutes to 10 hours have been found sufficient in most instances, however, and at the end of the reaction period, the treated starch is allowed to cool. If removal of salts and organic by-products is desired, then the starch is slurried in water. The pH of the slurry is adjusted to from 3.0 to 7.0 and the starch product recovered from the slurry by filtration, washed free of residual salts with water and isolated in a manner such as previously described above.

In a further embodiment of this invention a starch having both phosphoryl groups and amine groups can be prepared by reacting starch in aqueous suspension with the substituted imidazoles of this invention in the presence of an etherifying agent containing a primary, secondary, tertiary or quaternary amino group, and an etherifying group capable of reacting with the hydroxyl groups of the starch to form an ether. Such compounds and their reactions with starch are disclosed in Caldwell, U.S. 2,813,093, which is incorporated herein by reference.

It can be appreciated by the practitioner that a large number of variations may be easily effected in reacting the starch base with the described phosphates in accordance with the aqueous, or dry reaction procedures described above without departing from the general limitations set forth therein.

Starch phosphate esters may conveniently be divided into two classes. One class comprises monoesters of orthophosphoric acid, wherein only one of the three acidic functions of the acid is esterified with one starch molecule. A second class of starch phosphate esters comprises mixtures of mono-, di- and triesters of orthophosphoric acid in which one, two or three of the acidic functions of the orthophosphoric acid are esterified with starch molecules. The latter starch products are inhibited or cross-bonded starches since the formation of a di- or triester bond yields a cross-bonded network in which two or three starch segments are bonded together. This cross-bonding is known to inhibit the granule swelling power of such starches when cooked in water.

The starch products of this invention are believed to be the monoesters of orthophosphoric acid by virtue of their being substantially free of inhibition. The absence of inhibition may be determined by a "sediment volume test," a sensitive test for determining the presence or lack of inhibition. In this procedure, an aqueous dispersion of the starch being tested in a concentration of 0.1%, by weight, is cooked on a boiling water bath for about 20 minutes. The cooked dispersion is then cooled and allowed to stand at room temperature in a graduated vessel, such as a 100 ml. graduated cylinder, for a period of about 16 hours. A clear or slightly cloudy dispersion with no layer formation indicates an absence of inhibition. If the starch is inhibited, the cooked dispersion will separate into layers of a clear liquid and an opaque, swollen paste. In cases of extreme inhibition, the starch will completely settle out of solution in the form of a sediment. The sediment constitutes insoluble granules of starch whose swollen volumes are relative to the degree of inhibition of the starch being tested. The starch phosphate esters of this invention yielded very clear dispersions without any sediment formation, indicating the absence of substantial inhibition.

The starch phosphate esters prepared by the method of this invention may be employed as food thickeners in such products as soups, and in canned vegetables and fruits, where a thick bodied, creamy, relatively clear thickening agent is preferable instead of an opaque, gel-like agent which is obtained with untreated corn and many other cereal starches. Cationic starches which in addition have been also phosphorylated by the method of this invention are useful in the manufacture of paper. These starches are ordinarily incorporated with the stock during the manufacture of paper and such addition results in improved retention of pigments, increased strength and other desirable properties. The application of these cationic, phosphorylated starches in papermaking is described in U.S. 3,459,632. The starch products of this invention may find use as foundry core binders, textile sizes, and ore refining additives.

The following examples will further illustrate the embodiment of the present invention. In these examples, all parts are given by weight unless otherwise noted.

EXAMPLE I

This example illustrates the synthesis of the barium salt of N-phosphoryl-N'-methylimidazolium chloride and the usefulness of said salt in the preparation of the starch phosphate ester in accordance with the method of this invention.

Part I.—Preparation of the Phosphorylating Reagent

To a stirred solution comprising 16.4 grams of N-methylimidazole and 100 grams of water, 30.6 grams of phosphorus oxychloride were added slowly. The temperature of the solution was maintained at 41° F. (5° C.) and the pH of this solution was adjusted to and maintained at 11.0 by the addition of 2 N sodium hydroxide solution, while the reaction continued over a period of 1½ hours. Upon completion of the reaction, stirring was continued for 15 minutes, and 24.4 grams of barium chloride dihydrate and 1200 milliliters of ethanol were added to the solution. Thereafter the insoluble barium salt of N-phosphoryl-N'-methylimidazolium chloride was recovered by filtration, washed twice with ethanol, and air dried. A portion of this salt product was then used to phosphorylate a starch as set forth below.

Part II.—Preparation of the Starch Phosphate Ester

A total of 4.0 parts of the salt obtained in Part I above was added to a suspension comprising 50.0 parts of corn starch in 65.0 parts of water. The pH of the resultant mixture was adjusted to 11.0 with 3% aqueous sodium hydroxide. Then the mixture was stirred for 6 hours at 104° F. (40° C.) while the pH was controlled at 11.0 by the addition of 3% sodium hydroxide as required. The reaction mixture was cooled to about 77° F. (25° C.), whereupon the pH was adjusted to 3.0. The starch product was then recovered by filtration, washed three times with water and air dried. A portion of the starch product was washed with dilute nitric acid to remove any residual inorganic phosphates and the starch was then analyzed for phosphorus. The analytical method consists of combusting the starch in an oxygen filled Schoniger flask to convert all phosphorus into orthophosphate. The amount of orthophosphate is then determined colorimetrically based on the formation of reduced heteropolyphosphomolybdic acid (molybdenum blue). Upon analysis, it was determined that the starch phosphate ester contained 0.32% of phosphorus, by weight.

EXAMPLE II

This example illustrates the preparation of additional starch phosphate esters in accordance with this invention using varied starch bases.

Into each four beakers, A, B, C, and D, were placed 1.5 parts of the barium salt of N-phosphoryl-N'-methylimidazole prepared in Example I, 9.0 parts sodium sulfate, 0.9 parts sodium hydroxide and 38.0 parts of water. The solutions were stirred and to each there was admixed 30.0 parts of a particular starch base. The respective starch bases, each corresponding to the designated beaker are described as follows:

A—potato starch.
B—corn starch which contained 5.1%, by weight, dry basis, of propylene oxide.
C—corn starch which contained 0.30%, by weight, dry basis, of nitrogen obtained by treating the starch base with the reaction product of epichlorohydrin and trimethylamine, as described in Example IV of U.S. Pat. No. 2,876,217.

D—corn starch which contained 0.31%, by weight, dry basis, of nitrogen obtained by treating the starch with 4.0% diethylaminoethylchloride hydrochloride.

In each case, the resulting slurry was agitated at 104° F. (40° C.) for 16 hours and cooled to about 68° F. (20° C.). The pH was lowered to 3.0 by the addition of 10% aqueous hydrochloric acid solution, and the starch products were then recovered by filtration, washed three times with distilled water and dried. A small portion of the starch product was washed with dilute nitric acid and analyzed for phosphorus as described in Example I. The results are given in the table below.

| Material tested: | Percent phosphorus |
| --- | --- |
| Sample A | 0.24 |
| Sample B | 0.21 |
| Sample C | 0.20 |
| Sample D | 0.20 |

EXAMPLE III

This example illustrates the preparation of a starch phosphate ester using a gelatinized starch base.

A total of 20 parts of a waxy maize starch which had been acid-converted to a degree known in the trade as 85 fluidity was added to 160 parts of water. The resulting suspension was heated by means of steam bath at 212° F. (100° C.) for 20 minutes and cooled to 104° F. (40° C.). The pH of said dispersion was adjusted to 11.5 by the addition of 50% sodium hydroxide solution. Thereafter, 15.0 parts of the barium salt of N-phosphoryl-N'-methylimidazolium chloride was added and the dispersion was stirred at 104° F. (40° C.) and a pH of 11.5 for 18 hours. The pH was maintained by the addition of 30% sodium hydroxide solution as required. Following the reaction period, the pH was lowered to 3.0 by the addition of 9.5% hydrochloric acid solution. The starch product thus obtained was purified by dialysis first with an acid solution having a pH of 2.0 and then with distilled water. The purified starch was then isolated by precipitation from ethanol. Analysis of the starch phosphate indicated it contained 0.55%, by weight of phosphorus.

EXAMPLE IV

This example illustrates the preparation of additional starch phosphate esters in accordance with this invention employing varied reaction conditions.

Variation of pH Levels

A series of three starch phosphate esters, E, F, and G, were prepared by reacting fixed quantities of the phosphorylating reagent and starch at varied pH levels as follows:

Sample E.—A total of 4.0 parts of the barium salt of N-phosphoryl-N'-methylimidazolium chloride prepared in Example I was added to a slurry comprising 50.0 parts of corn starch and 65.0 parts of water. This mixture was stirred, and the pH thereof was adjusted to 10.5 by the addition of dilute hydrochloric acid. The resulting mixture was then agitated at 104° F. (40° C.) for 6 hours at a pH level of 10.5 maintained by the addition of 3% sodium hydroxide as called for, and cooled to about 68° F. (20° C.), whereupon the pH was adjusted to 3.0. The starch product was then recovered by filtration, washed three times with distilled water and dried.

A portion of the product was washed with a dilute nitric acid solution to remove any residual inorganic phosphates prior to analysis. On analysis, it was determined that this starch phosphate ester contained 0.23%, by weight, of phosphorus.

Sample F.—The procedural steps of E above were repeated, except the 4.0 parts of the reagent were reacted with the 50.0 parts of corn starch at a pH of 9.5. The product thus produced contained 0.13%, by weight of phosphorus.

Sample G.—A total of 3.75 parts of the reagent and 50.0 parts of corn starch were added to a solution comprising 15 parts of sodium sulfate, 1.5 parts of sodium hydroxide, and 65 parts of water. The resulting slurry was then reacted in a manner similar to that employed in the preparation of E above, except the initial pH of 11.8 was not adjusted prior to or throughout the reaction. The starch product was then processed and analyzed as described above. This starch phosphate ester contained 0.44% by weight of phosphorus.

To further evaluate the effectiveness of the phosphorylating agent on the starch base, a sample of this starch phosphate ester (sample G) was tested as follows:

A suspension comprising 8 parts of the starch phosphate ester and 96 parts of water and having a pH of 7.0 was cooked by means of a boiling water bath at 212° F. (100° C.) for 20 minutes. Upon cooling to about 73.4° F. (20° C.) and standing for 20 hours, it was observed that the resulting viscous dispersion was very cohesive and stable.

Variation of Reaction Temperatures and Times

A series of three starch phosphate esters, H, I, and J were prepared by reacting at pH 11.8 in each instance, 2.25 parts of the barium salt of N-phosphoryl-N'-methylimidazole with 30.0 parts of corn starch suspended in a solution of 9.0 parts of sodium sulfate and 0.9 parts of sodium hydroxide in 38.0 parts of water. At the end of the reaction, the pH was adjusted to 3.0 by the addition of 10% hydrochloric acid solution and the starch recovered by filtration, washed, and dried. The particular conditions of the respective reactions were as follows:

In the preparation of sample H, the reaction was conducted under continued agitation of 104° F. (40° C.) over a period of 2 hours. The starch product was recovered and processed, in the manner described hereinabove. On analysis, it was found that this starch phosphate ester contained 0.24%, by weight, of phosphorus.

For the preparations of sample I and J the reactions were conducted under continued agitation at 73.4° F. (23° C.) and 122° F. (50° C.) respectively, over periods of 16 hours. On analysis, it was found that the starch phosphate ester identified as I had a phosphorus content of 0.08%, by weight, and that identified as J had 0.44%, by weight of phosphorus.

EXAMPLE V

This example illustrates the method of this invention in preparing a starch phosphate ester which also contains cationic substituent groups.

A total of 1.5 parts barium salt of N-phosphoryl-N'-methylimidazolium chloride, 1.2 parts calcium hydroxide, 1.2 parts of diethylaminoethylchloride hydrochloride and 30.0 parts corn starch were added to 38.0 parts water. The pH of the resulting mixture was 12.1. The mixture was allowed to react with agitation for 16 hours at 104° F. (40° C.) and then cooled to room temperature. The pH was lowered to 3.0 by the addition of hydrochloric acid and the resultant starch product recovered by filtration, washed three times with distilled water and dried. On analysis, the product was found to contain 0.14% phosphorus and 0.32% nitrogen, by weight.

An aqueous suspension of the thus prepared starch product in a concentration of 0.1%, by weight, was cooked at pH 3.0 in a boiling bath for 20 minutes. The cooked dispersion was then allowed to stand in a 100 ml. graduated cylinder at room temperature for 16 hours. The resultant dispersion remained very clear and no sediment was observed indicating that no inhibition of the starch had taken place.

The starch product prepared as described above contains cationic as well as phosphate ester (anionic) groups, and, as such, is particularly useful in the manufacture of paper. The described starch product was added to bleached sulfite pulp at a concentration of 0.2%, based on the weight of dry pulp, in a conventional papermaking process. Pigment retention values were determined to show the effect of the starch product at pH levels of 4.6, 6.0, and 7.6. Paper sheets were prepared from each of the three pulps by means of the Williams Standard Sheet Mold and were thereafter tested for titanium dioxide pigment retention by the method described in TAPPI, Standard #T413 m. 58. Pigment retention values employing the starch product which had been substituted to contain only the cationic group (prepared as described above, but without the barium salt of N-phosphoryl-N'-methylimidazole) were also determined in an identical manner for comparison purposes. The results of these pigment retention determinations are summarized in the table below.

TABLE I

| Standard product employed | Percent titanium dioxide retention at pH | | |
|---|---|---|---|
| | 4.6 | 6.0 | 7.6 |
| Phosphorylated diethylaminoethyl ether of starch (prepared above) | 51 | 72 | 55 |
| Diethylaminoethyl ether of starch | 41 | 56 | 58 |

The above data clearly indicate that the paper prepared from pulp having the phosphorylated, cationic starch therein possessed greater pigment retention ability than that wherein a non-phosphorylated cationic starch was employed in the pulp.

EXAMPLE VI

This example illustrates the use of aqueous solutions of the sodium salt of N-phosphoryl-N'-methylimidazole in the preparation of the starch phosphate esters in accordance with the method of this invention and their usefulness in the manufacturing of paper having greater than usual pigment retention abilities.

Part I.—Preparation of the Phosphorylating Reagent

A total of 3.0 parts of N-methylimidazole was dissolved in 60 parts of water. The pH of the resulting stirred solution was adjusted to 11.5 and the temperature was lowered to 41° F. (50° C.) and 6.0 parts of phosphorus oxychloride were added slowly over a 1 hour period, while the pH was maintained between 11.0 and 12.0 by the periodic addition of 2 N sodium hydroxide solution and the temperature between 41–50° F. (5–10° C.) by means of an ice bath. After the addition of the phosphorus oxychloride, the stirring was continued for 1 and ½ hours. A total of 87 parts 2 N sodium hydroxide solution was required to control the pH during the reaction. Portions of the resulting 156.0 parts of the aqueous solution of the sodium salt of N-phosphoryl-N'-methylimidazolium chloride thus obtained were then used to phosphorylate 2 starches as set forth below.

Part II.—Preparation of the Starch Phosphate Esters

Starch 1.—A total of 26.0 parts of the reagent salt solution prepared in Part I above was added to a slurry comprising 100 parts of corn starch in 125 parts of water. Then 4.0 parts of calcium hydroxide and 4.0 parts of diethylaminoethylchloride hydrochloride were added. This mixture was agitated at 104° F. (40° C.) for 16 hours and cooled to about 68° F. (20° C.). The pH of the resulting dispersion was adjusted to 3.0 by the addition of a hydrochloric acid solution. The starch product was then recovered and processed using the methods employed in Part II of Example I.

Starch 2.—A total of 26.0 parts of the reagent salt solution prepared in Part I hereinabove was added to a slurry comprising 100 parts of corn starch and a solution of 30.0 parts of sodium sulfate and 3.0 parts of sodium hydroxide in 125 parts of water. To this slurry there was also added 4.0 parts of diethylaminoethylchloride hydrochloride. This mixture was then reacted using the method employed for Starch 1 above. This starch product was also recovered and processed, using the methods employed in Part II of Example I.

Control.—Using the same ingredients in the same concentrations employed in the preparation of Starch 1, except the aqueous solution of the sodium salt of N-phosphoryl-N'-methylimidazolium chloride was omitted, a control starch product was prepared.

The above described starches were then used in the manufacture of papers as described in Example V, and the papers thus obtained were tested for pigment retention abilities in the manner employed in Example V. Comparative test results are presented in Table 2 below.

TABLE 2

| Material tested | Percent titanium dioxide retention at pH | |
|---|---|---|
| | 4.6 | 6.0 |
| Starch 1 | 51 | 80 |
| Starch 2 | 55 | 80 |
| Control | 42 | 52 |

The above data show that the paper prepared with the phosphorylated cationic Starches 1 and 2 displayed improved pigment retention abilities over that prepared with the control cationic starch.

EXAMPLE VII

This example illustrates additional preparations of starch phosphate esters in accordance with the method of this invention, using reagents having varied N'-substituted groups.

The various phosphorylating reagents were each prepared in a manner similar to that employed in Example VI, except herein the various reagents were reacted at the concentrations set forth in the chart below.

| Reagent | Phosphorylating reagent | | | | |
|---|---|---|---|---|---|
| | I | II | III | IV | V |
| N-propylimidazole | 1.25 | | | | |
| N-benzylimidazole | | 2.5 | | | |
| N-vinylimidazole | | | 1.5 | | |
| 1,2-dimethylimidazole | | | | 0.75 | |
| N-allylimidazole | | | | | 1.0 |
| Water | 25 | 50 | 25 | 40 | 30 |
| Phosphorous oxychloride | 2.5 | 2.5 | 3.0 | 1.5 | 2.0 |
| 2 N sodium hydroxide | 47.5 | 45.0 | 52.0 | 24 | 37.2 |

To each of the aqueous solutions of phosphorylating reagents prepared as described above, were added 1.5 parts of sodium hydroxide and 15.0 parts sodium sulfate. Then 50 parts of corn starch were added and the resulting slurry was agitated for 16 hours at 40° C., and cooled to room temperature. The pH levels were lowered to 5.0 with 10% aqueous hydrochloric acid. Thereafter, the starch products isolated by filtration, washed three times with distilled water, and dried. On analyses, the starch phosphate esters prepared with phosphorylating reagents I, II, III, IV and V contained 0.42, 0.34, 0.13, 0.06 and 0.39% phosphorus, by weight respectively.

EXAMPLE VIII

This example illustrates the method of this invention utilizing a dry reaction procedure.

A total of 1.2 parts of sodium hydroxide was added to 246 parts of an aqueous solution of the sodium salt of N-phosphoryl-N'-methylimidazole prepared by the procedure described in Example VI. Then 150 parts of corn starch were added. The pH of the resulting solution was 11.7. Said solution was stirred for about 10 minutes, filtered, and air dried to about 15% moisture content. The dried starch product was then divided into three parts and each part placed in an oven and heated at the temperature and reaction times indicated below. The starch was then cooled to room temperature, suspended in distilled water and the pH lowered to 3.0 with 10% aqueous hydrochloric acid. The starch product was isolated by filtration, washed three times with distilled water and dried.

On analysis, the starch phosphate esters contained the percent phosphorus, by weight, listed in the following table.

| | Reaction temperature | Reaction time, hours | Percent phosphorus by weight |
|---|---|---|---|
| Starch: | | | |
| A | 104° F. (40° C.) | 8 | 0.19 |
| B | 158° F. (70° C.) | 7 | 0.18 |
| C | 302° F. (150° C.) | 5 | 0.14 |

EXAMPLE IX

This example illustrates the preparation of non-granular starch phosphate esters of this invention at high temperature.

A total of 25 parts of waxy maize which had been previously acid converted to a degree known in the trade at 85 fluidity was added to 100 parts water and the resulting suspension cooked in a boiling water bath at pH 12.5 for 20 minutes. A total of 20.6 parts of an aqueous solution of the sodium salt of N-phosphoryl-N'-methylimidazolium chloride prepared from 0.5 parts N-methylimidazole and 1.0 part of phosphorus oxychloride as in Example VI, was added. The resulting dispersion was stirred for six hours at 203° F. (95° C.), and cooled. The pH of the cooled starch dispersion was 8.4. The starch product was purified by dialysis with distilled water and isolated by precipitation from ethanol. On analysis, the starch phosphate ester was found to contain 0.08% phosphorus, by weight.

Summarizing, it is thus seen that this invention provides a novel method for the preparation of starch phosphate esters. Moreover, the invention provides an efficient and economical reaction procedure for chemically altering the paste properties of starch.

Variations may be made in proportions, procedures and materials without departing from the scope of this invention which is defined by the following claims.

What is claimed is:

1. A method for the preparation of starch phosphate esters comprising the steps of:
   (a) reacting a starch base with a compound selected from the group consisting of those substituted imidazoles corresponding to the general structural formula:

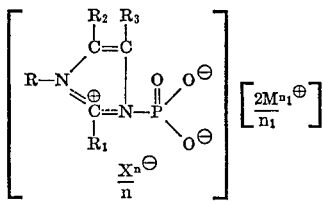

wherein R represented an alkyl, alkenyl or aralkyl group having from 1-8 carbon atoms, any two of $R_1$, $R_2$, and $R_3$ are hydrogen atoms, the remaining one being hydrogen or an alkyl group having from 1-3 carbon atoms, X is an anion, and M is a cation, and $n$ and $n_1$ are the valence numbers of X and M, respectively; and (b) isolating the resulting starch product,
   wherein said reaction is conducted in an aqueous medium at pH level of from about 9.5–13.0, and wherein said reaction is conducted at a temperature of from 65–205° F. for a period of from 1 to 24 hours.

2. The method of claim 1, wherein said starch base is reacted with the barium salt of N-phosphoryl-N'-methylimidazolium chloride.

3. The method of claim 1, wherein said starch base is reacted with the sodium salt of N-phosphoryl-N'-methylimidazolium chloride.

4. A method for the preparation of starch phosphate esters comprising the steps of:
   (a) in a substantially dry reaction medium reacting a starch base with a compound selected from the group consisting of those substituted imidazoles corresponding to the general structural formula:

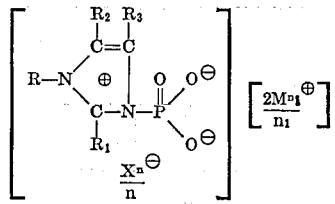

wherein R represented an alkyl, alkenyl or aralkyl group having from 1-8 carbon atoms, and two of $R_1$, $R_2$, and $R_3$ are hydrogen atoms, the remaining one being hydrogen or an alkyl group having from 1-3 carbon atoms, X is an anion, and M is a cation, and $n$ and $n_1$ are the valence numbers of X and M, respectively; and (b) isolating the resulting starch product.

5. The method of claim 1, wherein said starch base is a gelatinized starch.

6. The method of claim 1, wherein said starch base is a granular starch.

7. The method of claim 1, wherein said starch base contains amine substituent groups.

8. The method of claim 1, wherein said starch base contains diethyl aminoethyl groups.

9. The method of claim 1, wherein said starch base contains 3-(trimethylammonium chloride)-2-hydroxypropyl ether groups.

10. The method of claim 1, wherein the reaction is carried out in the presence of an etherifying reagent containing an amino group.

References Cited

UNITED STATES PATENTS

| 2,884,412 | 4/1959 | Neukom | 260—233.5 |
| 2,884,413 | 4/1959 | Kerr et al. | 260—233.5 |
| 3,562,103 | 2/1971 | Moser et al. | 260—233.3 R |
| 3,719,662 | 3/1973 | Tessler | 260—233.5 |

MELVYN I. MARQUIS, Primary Examiner

U.S. Cl. X.R.

260—233.3 A, 233.3 R